United States Patent
Zhang et al.

(10) Patent No.: US 11,936,433 B2
(45) Date of Patent: Mar. 19, 2024

(54) INTEGRATED MICROWAVE PHOTON TRANSCEIVING FRONT-END FOR PHASED ARRAY SYSTEM

(71) Applicant: CHINA ELECTRONICS TECHNOLOGY GROUP CORPORATION No. 44 RESEARCH INSTITUTE, Chongqing (CN)

(72) Inventors: Yu Zhang, Chongqing (CN); Xu Liang, Chongqing (CN); Jing Xu, Chongqing (CN); Lijun Sun, Chongqing (CN)

(73) Assignee: CHINA ELECTRONICS TECHNOLOGY GROUP CORPORATION NO. 44 RESEARCH INSTITUTE, Chongqing (CN)

( * ) Notice: Subject to any disclaimer, the term of this patent is extended or adjusted under 35 U.S.C. 154(b) by 80 days.

(21) Appl. No.: 17/756,458

(22) PCT Filed: Apr. 22, 2020

(86) PCT No.: PCT/CN2020/086082
§ 371 (c)(1),
(2) Date: May 25, 2022

(87) PCT Pub. No.: WO2021/128666
PCT Pub. Date: Jul. 1, 2021

(65) Prior Publication Data
US 2023/0008212 A1    Jan. 12, 2023

(30) Foreign Application Priority Data

Dec. 25, 2019 (CN) .......................... 201911352920.9

(51) Int. Cl.
*H04B 10/61* (2013.01)
*H04B 10/40* (2013.01)
(Continued)

(52) U.S. Cl.
CPC ........... *H04B 10/616* (2013.01); *H04B 10/40* (2013.01); *H04B 10/70* (2013.01); *H04J 14/0202* (2013.01)

(58) Field of Classification Search
CPC ...... H04B 10/40; H04B 10/616; H04B 10/70; H04B 10/43; H04B 10/50; H04B 10/60;
(Continued)

(56) References Cited

U.S. PATENT DOCUMENTS

2018/0316383 A1* 11/2018 Kamgaing ............. H01Q 21/06
2019/0113680 A1*  4/2019 Sodagar ................. G02B 6/305

FOREIGN PATENT DOCUMENTS

CN    103941235 A    7/2014
CN    104092485 A   10/2014
(Continued)

OTHER PUBLICATIONS

WIPO, China International Search Authority, International Search Report (with translation) and Written Opinion dated Oct. 12, 2020 in International Patent Application No. PCT/CN2020/086082, 9 pages.

*Primary Examiner* — Hibret A Woldekidan
(74) *Attorney, Agent, or Firm* — Inskeep IP Group, Inc.

(57) ABSTRACT

The present disclosure relates to the field of microwave and optoelectronic technologies, and in particular to an integrated microwave photon transceiving front-end for a phased array system, including: a ceramic substrate, on which a control integrated circuit, a silicon-based photonic integrated chip, a first amplifying chipset, a second amplifying chipset, and a microwave switch chipset are carried.

(Continued)

The control integrated circuit is configured to control the silicon-based photonic integrated chip and the microwave switch chipset by means of an input control signal. The silicon-based photonic integrated chip is connected at one end with an input/output optical fiber, and at the other end with the first amplifying chipset and the second amplifying chipset. The two amplifying chipsets are connected to the microwave switch chipset respectively, and the microwave switch chipset is further connected with a phased array antenna.

7 Claims, 4 Drawing Sheets

(51) Int. Cl.
*H04B 10/70* (2013.01)
*H04J 14/02* (2006.01)

(58) Field of Classification Search
CPC ............... H04B 10/501; H04J 14/0202; H04J 14/0209; H01Q 1/523; H01Q 25/00; H01Q 3/2676; H01Q 3/267; H01Q 3/2658
See application file for complete search history.

(56) References Cited

FOREIGN PATENT DOCUMENTS

| CN | 106230516 A | 12/2016 |
| WO | WO2018128662 A2 | 7/2018 |

* cited by examiner

INTEGRATED MICROWAVE PHOTON TRANSCEIVING FRONT-END FOR PHASED ARRAY SYSTEM

RELATED APPLICATIONS

This application is the U.S. National Phase of and claims priority to International Patent Application No. PCT/CN2020/086082, International Filing Date Apr. 22, 2020, entitled Integrated Microwave Photon Transceiving Front-End For Phased Array System; which claims benefit of and priority to Chinese Application No. 201911352920.9 filed Dec. 25, 2019 entitled Integrated Microwave Photon Transceiving Front End For Phased Array System; both of which are incorporated herein by reference in their entireties.

TECHNICAL FIELD

The present disclosure relates to the field of microwave and optoelectronic technologies, and in particular to a microwave photon transceiving front-end based on photonic integrated technology that can be used in a phased array system.

BACKGROUND

Electronic information systems based on phased array antennas can be used in military applications such as radar, electronic warfare, and civilian applications for 5G/6G communications. Compared with traditional mechanically-scanned antennas, phased array antennas have higher microwave radiation directivity, faster scanning speed, and stronger multi-object (multi-user) tracking capability.

Currently, in the electronic information systems based on phased array antennas, the beam pointing and scanning are usually implemented by a microwave phase shifter, which is why it is called phased array system. However, since the amount of phase shift of a microwave phase shifter used does not change with frequency, or the amount of phase shift does not have a linear relationship with frequency, this problem leads to the deflection of the beam pointing formed by the phased array antenna when the operating band is changed. This effect is referred to as the "aperture effect" of the phased array system, which severely restricts the operating band range and the instantaneous bandwidth of the phased array system.

By controlling the phase shift of each antenna element through a true time delay technology, it is theoretically possible to achieve a beam pointing without deflection at any wideband, i.e., to completely eliminate the aperture effect of the phased array system. Therefore, the introduction of a wideband true time delay network in a phased array system is important to ensure that the phased array system is capable of performing excellently in a larger operating band range or a higher instantaneous bandwidth.

Currently, there are mainly two technologies for implementing the true time delay, one is based on microwave technology, which uses microwave waveguides or microstrip lines in conjunction with microwave switches to implement the true time delay, and the other is based on photonic technology, which converts a microwave signal into an optical signal, and then converts the optical signal back into the microwave signal after implementing the true time delay in an optical domain. At present, there are some problems in both technologies.

The first technology has a limited operating bandwidth, as the optimized design, whether for waveguides or microstrip lines, is frequency dependent, which cannot maintain a consistent true time delay over a wide frequency range and a low insertion loss. Thus, it is limited to use the conventional microwave technology to implement a true time delay, because it will limit the operating bandwidth of a phased array system.

The second technology takes advantage of the ultra-wideband of photonic technology, which can achieve accurate true time delay in each microwave band currently in use. However, the second technology is mainly implemented using discrete devices such as lasers, modulators, detectors, optical delays, etc. and the functional unit for implementing the true time delay has a large volume. For the phased array system with a large number of antenna elements, many of these functional units are required to form a complex delay network, which leads to a huge volume of the whole delay network. In many cases, it can't meet the application requirements of the phased array system at all.

SUMMARY

Therefore, in order to solve the above problems, in the present disclosure, an electro-optical conversion unit, a photon true time delay unit, an amplitude adjustment unit, a photoelectric conversion unit and other units are integrated on a silicon-based chip by means of photonic integration. The ultra-wideband advantage of photonic technology is taken to solve the "aperture effect" problem of a phased array system, and the high integration advantage of photonic integrated technology is taken to solve the problem of limited space size in a large-scale phased array system.

Technical themes of the present disclosure are proposed as follows.

There is provided an integrated microwave photonic transceiver front end for a phased array system, including: a ceramic substrate, on which a control integrated circuit, a silicon-based photonic integrated chip, a power amplifying chipset, a low noise amplifying chipset, and a microwave switch chipset are carried. The control integrated circuit is configured to control the silicon-based photonic integrated chip and the microwave switch chipset by means of an input control signal. The silicon-based photonic integrated chip is connected at one end with an input/output optical fiber, and at the other end with the power amplifying chipset and the low noise amplifying chipset. The two amplifying chipsets are connected to the microwave switch chipset respectively, and the microwave switch chipset is further connected with a phased array antenna. Further, the control integrated circuit is configured to convert an externally input control signal into a control level, to control on-off of each microwave switch in the microwave switch chipset, and to control a switching state of each optical switch in the silicon-based photonic integrated chip.

Further, the silicon-based photonic integrated chip comprises a transmitting beam forming chip and a receiving beam forming chip.

Further, the transmitting beam forming chip comprises a first wavelength division demultiplexer, a plurality of first optical switches, and a Ge—Si detector; the first wavelength division demultiplexer is configured to receive an optical signal from the input optical fiber and multiplex the optical signal into a plurality of photon channels, and each photon channel is formed by the plurality of first optical switches connected in series and the plurality of optical waveguides with different time delays; the Ge—Si detector is configured to convert the delayed optical signal into a microwave signal, which is output to the power amplifying chipset through a traveling wave electrode.

Further, a first variable optical attenuator is further connected between the first optical switches and the Ge—Si detector.

Further, the receiving beam forming chip comprises a second wavelength division demultiplexer, a plurality of second optical switches, a lithium niobate thin film modulator, and a wavelength division multiplexer; the second wavelength division demultiplexer is configured to demultiplex an optical signal input via the input optical fiber into a plurality of photon channels; the lithium niobate thin film modulator is configured to receive a microwave signal amplified by the second amplifying chipset and modulate the optical signal of each photon channel; wherein the modulated optical signal in each photon channel is transmitted through the second optical switches connected in series and the plurality of optical waveguides with different time delays, and the delayed optical signals are multiplexed into the output optical fiber through the wavelength division multiplexer for output.

Further, a second variable optical attenuator is further connected between the second optical switches and the wavelength division multiplexer.

Further, the microwave switch chipset comprises a plurality of microwave switches for connecting a microwave signal between the power amplifying chipset and the phased array antenna, or connecting a microwave signal between the phased array antenna and the low noise amplifying chipset.

Beneficial effects of the present disclosure are as follows.

In the integrated microwave photonic transceiver front end of the present disclosure, the original phase shifter is replaced, which eliminates the aperture effect of the phased array system fundamentally, and can realize the beam pointing without deflection under ultra-wideband, so as to ensure that the phased array system can operate in a larger operating band range or a higher instantaneous bandwidth, and the true time delay network based on the photonic integrated chip enables the system to have a larger operating bandwidth. The integrated microwave photonic transceiver front end provided by the present disclosure is based on a silicon-based photonic integrated process and a lithium niobate thin film process, and various units such as a modulator unit, a photon true time delay unit, an amplitude adjustment unit, a detector unit are monolithically integrated on a silicon material. Therefore, the size of the transceiver front end of the phased array system based on the photon true time delay network can be greatly reduced, and especially in the phased array system with relatively large scale and relatively large number of channels, the front end architecture of the microwave photonic transceiver provided by the present disclosure will have more obvious advantages.

DETAILED DESCRIPTION

In order to make the objectives, technical schemes and advantages of the present disclosure clearer, the technical schemes in the embodiments of the present disclosure will be clearly and completely described below with reference to the accompanying drawings. Obviously, the described embodiments are only a part, but not all, of the embodiments of the present disclosure.

Figure 1:
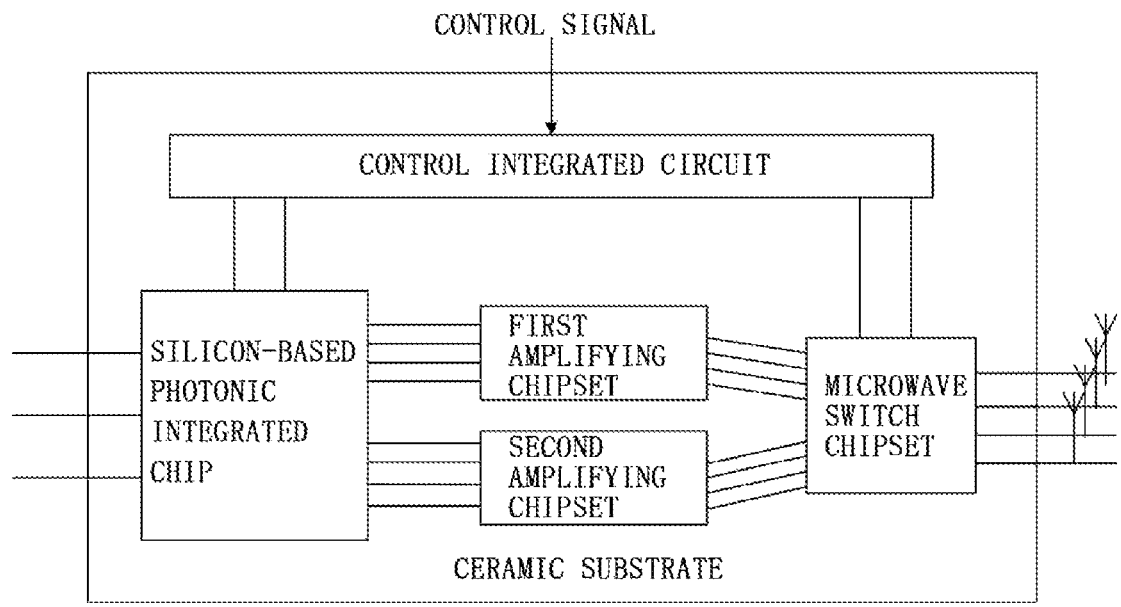
FIG. 1 is a schematic diagram of an integrated microwave photonic transceiver front end for a phased array system according to the present disclosure.

As shown in FIG. 1, an integrated microwave photonic transceiver front end for a phased array system according to the present disclosure includes a ceramic substrate, on which a control integrated circuit, a silicon-based photonic integrated chip, a first amplifying chipset, a second amplifying chipset, and a microwave switch chipset are carried. The control integrated circuit is configured to control the silicon-based photonic integrated chip and the microwave switch chipset by means of an input control signal. The silicon-based photonic integrated chip is connected at one end with an input/output optical fiber, and at the other end with the first amplifying chipset and the second amplifying chipset. The two amplifying chipsets are connected to the microwave switch chipset respectively and the microwave switch chipset is further connected with a phased array antenna.

As a preferred embodiment, the control integrated circuit, the silicon-based photonic integrated chip, the first amplifying chipset, the second amplifying chipset and the microwave switch chipset are carried on the ceramic substrate by bonding or sintering.

As a possible implementation, the silicon-based photonic integrated chip is connected at one end with the input/output optical fiber, and at the other end with the first amplifying chipset and the second amplifying chipset. The microwave switch chipset is connected at one end with the phased array antenna, and at the other end with the first amplifying chipset and the second amplifying chipset. The silicon-based photonic integrated chip and the microwave switch chipset are controlled by the control integrated circuit which, in the form of an integrated circuit, converts an externally input control signal into a control level, to control on-off of each microwave switch in the microwave switch chipset, and to control a switching state of each optical switch in the silicon-based photonic integrated chip.

The input/output optical fiber serves as an optical input/output interface of the transceiver front end, and an output RF connector is connected between the phased array antenna and the microwave switch chipset. The output RF connector is soldered to a microwave electrode of the microwave switch chipset, and then connected with the external phased array antenna. The output RF connector serves as a microwave input/output interface, and a control signal output interface is provided on the control integrated circuit. The above interfaces serve as ports for connecting the transceiver front end of the present disclosure to external signals/devices/apparatuses.

Preferably, a ratio of the input optical fiber to the output optical fiber is set as 2:1, for example there are two input optical fibers and one output optical fiber.

In an embodiment, the first amplifying chipset is configured to amplify a power of a microwave signal output from the silicon-based photonic integrated chip. The second amplifying chipset is configured to amplify a low noise of the microwave signal output from the microwave switch chipset.

Figure 2:
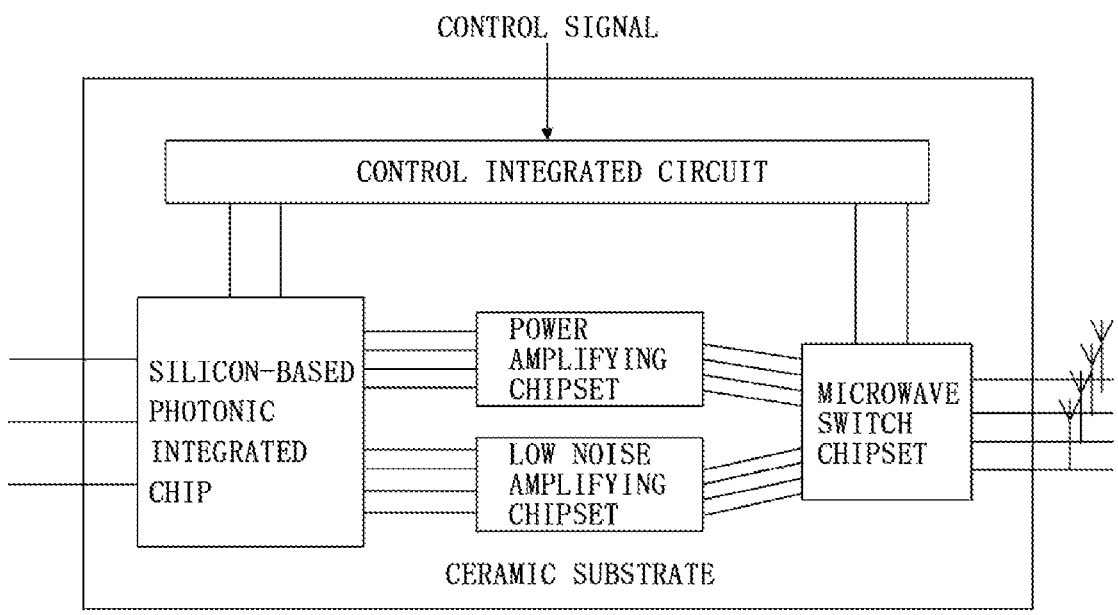
FIG. 2 is a schematic diagram of an integrated microwave photonic transceiver front end for a phased array system according to a preferred embodiment of the present disclosure.

As shown in FIG. 2, in a preferred embodiment, the first amplifying chipset is a power amplifying chipset which has a function of amplifying a high-saturation output power of multi-channel microwave signals, so as to realize high power amplification of N-channel microwave signals output from a transmitting beam forming section of the silicon-based photonic integrated chip.

As shown in FIG. 2, in a preferred embodiment, the second amplifying chipset is a low noise amplifying chipset, which has a function of amplifying a low noise of the multi-channel microwave signals, so as to realize low noise amplification of N-channel microwave signals from the microwave switch chipset.

Of course, the first and second amplifying chipsets may not be limited to realizing the above-described function, which function, as an amplifying chipset, to amplify microwave signals. In a preferred embodiment, the microwave switch chipset includes a plurality of 2×1 microwave switches which can realize communication of N channels of microwave signals between the power amplifying chipset and the antenna, or between the phased array antenna and the low noise amplifying chipset.

In an embodiment, the silicon-based photonic integrated chip includes a transmitting beam forming chip and a receiving beam forming chip, each of which is an independent chip.

Figure 3:
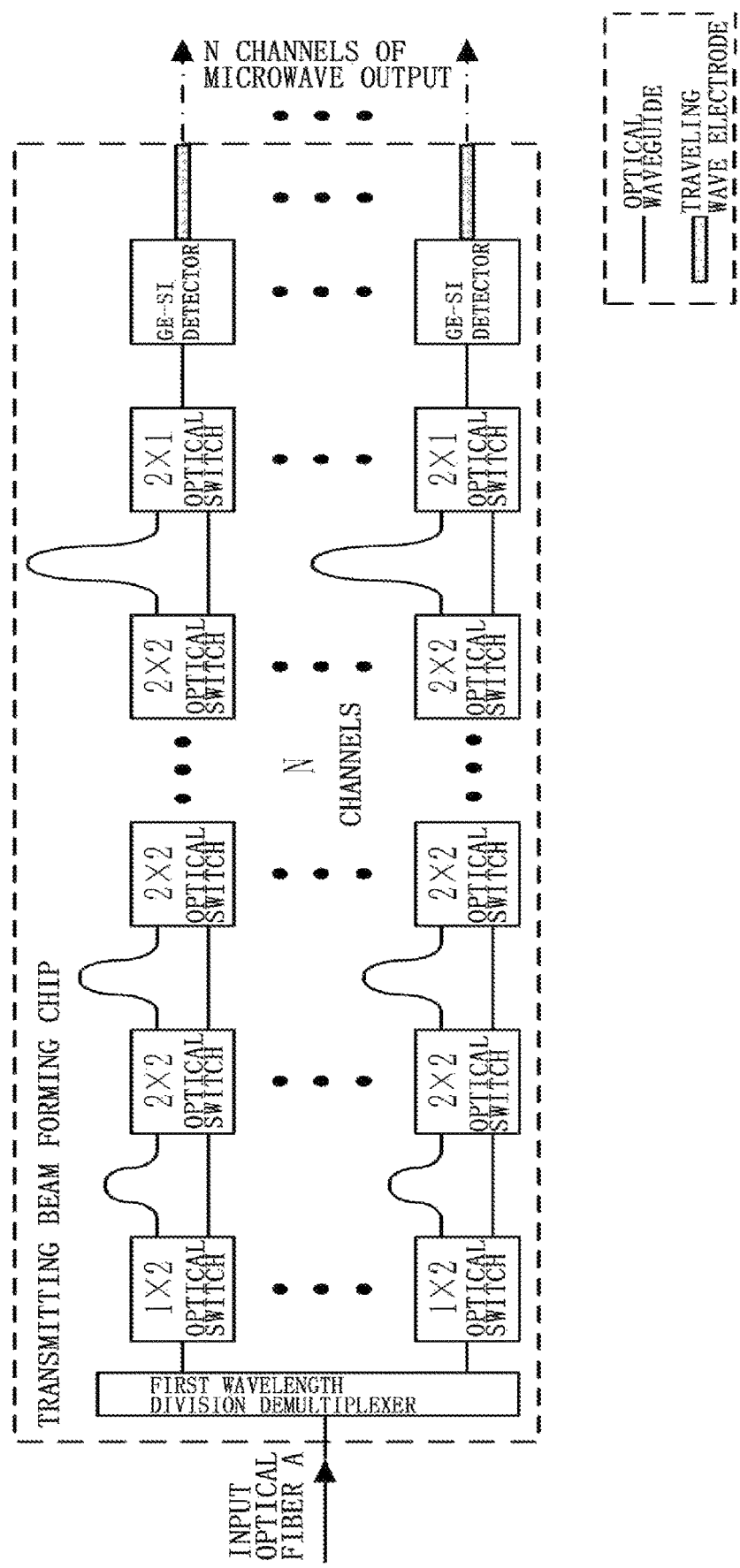
FIG. 3 is a schematic diagram of a transmitting beam forming chip according to the present disclosure.

As shown in FIG. 3, in an embodiment, the transmitting beam forming chip includes a first wavelength division demultiplexer, a 1×2 optical switch, a 2×2 optical switch, a 2×1 optical switch, a Ge—Si detector, and an output traveling wave electrode. An optical wave carried with a microwave signal to be transmitted (the optical wave includes N wavelengths, each being carried with a microwave signal to be emitted) is transmitted through an input optical fiber. In this embodiment, a single-mode optical fiber is selected to input the optical signal (optical wave/optical wave signal) into the transmitting beam forming chip of the silicon-based photonic integrated chip, to be demultiplexed into N channels via the first wavelength division demultiplexer, each channel being formed by a plurality of optical switches connected in series and M optical waveguides with different time delays, and between every two consecutive optical switches an optical waveguide with time delay function being provided. M-bit digitally controlled time delay can be realized. The delayed optical signal is converted into a microwave signal by the Ge—Si detector and output via the traveling wave electrode.

Figure 4:
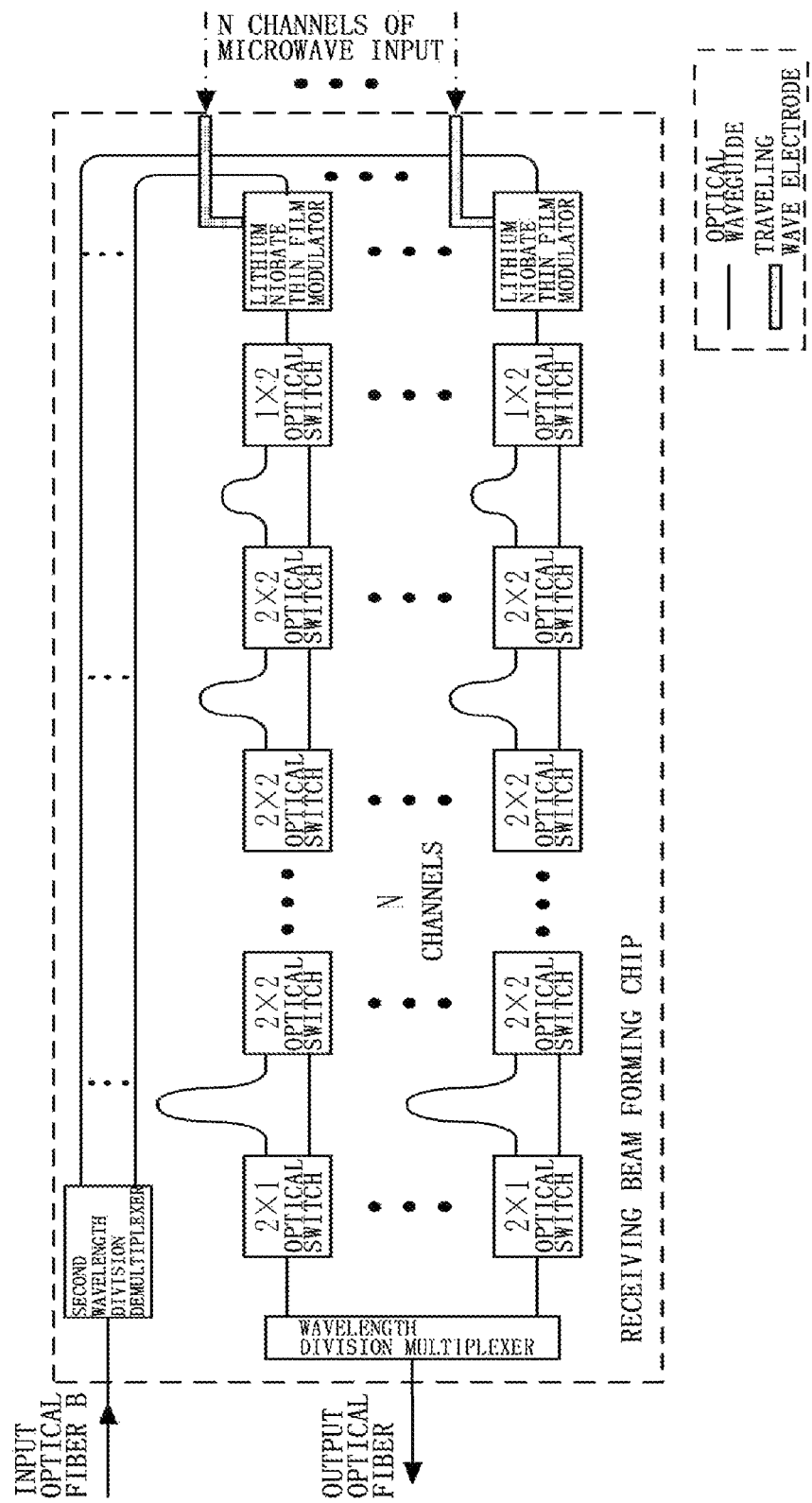
FIG. 4 is a schematic diagram of a receiving beam forming chip according to the present disclosure.

As shown in FIG. 4, in an embodiment, the receiving beam forming chip includes a second wavelength division demultiplexer, a lithium niobate thin film modulator, an input traveling wave electrode, a 1×2 optical switch, a 2×2 optical switch, a 2×1 optical switch, and a wavelength division multiplexer. A non-modulated optical signal with N wavelengths is transmitted through an input optical fiber. In this embodiment, a single-mode optical fiber is selected to input the non-modulated optical signal into the receiving beam forming chip of the silicon-based photonic integrated chip, to be demultiplexed into N channels via the second wavelength division demultiplexer, and the optical signal of each channel is modulated by a microwave signal from the input traveling wave electrode. The modulated optical signal of each channel is transmitted through the optical switches connected in series and M optical waveguides with different time delays, between every two consecutive optical switches an optical waveguide with time delay function being provided. M-bit digitally controlled time delay can be realized. The delayed optical signals are multiplexed via the wavelength division multiplexer into a single-mode optical fiber for output.

Figure 5:
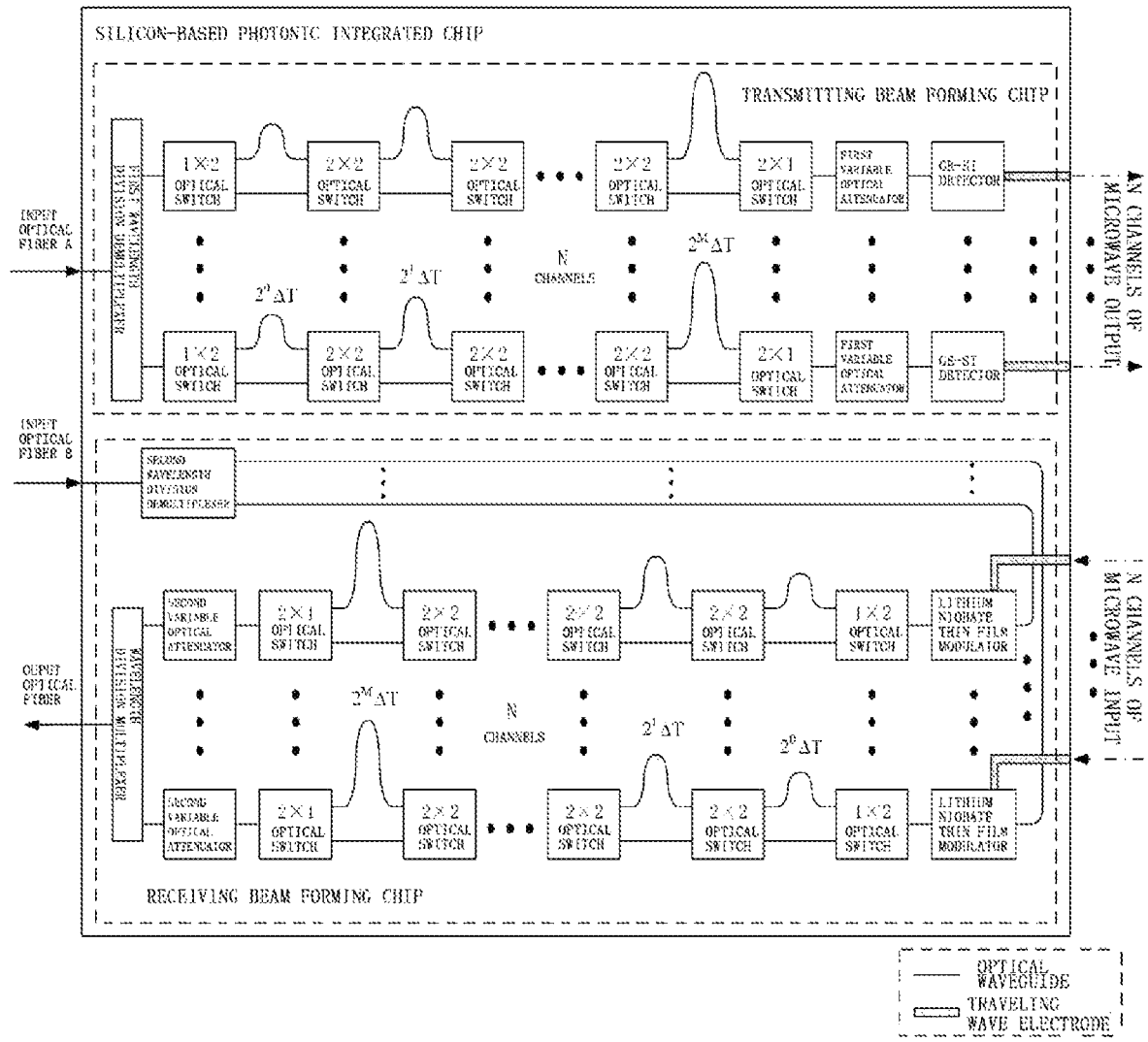
FIG. 5 is a schematic diagram of a silicon-based photonic integrated chip according to the present disclosure.

As shown in FIG. 5, in a preferred embodiment, the transmitting beam forming chip and the receiving beam forming chip are integrated chips. The transmitting beam forming chip further includes a first variable optical attenuator between the first optical switch and the Ge—Si detector. The first variable optical attenuator is configured to control an amplitude of the delayed optical signal. The receiving beam forming chip further includes a second variable optical attenuator between the second optical switch and the wavelength division multiplexer. The second variable optical attenuator is configured to control an amplitude of the delayed optical signal.

It is understood that, in addition, the terms "first", "second" are used for descriptive purposes only and are not to be taken as indicating or implying relative importance or as implicitly indicating the number of technical features indicated, and thus a feature defined by "first", "second" may include at least one such feature either explicitly or implicitly. For example, the first variable optical attenuator and the second variable optical attenuator are the same variable optical attenuator. In the present disclosure, the terms "first" and "second" are used to distinguish between the two variable optical attenuators to indicate different positions thereof.

The operation principle of the integrated microwave photonic transceiver front end for a phased array system according to the present disclosure will be described as follows. When transmitting, a microwave signal necessary for transmitting beam forming of the phased array antenna can be generated. When receiving, a microwave signal received by the phased array antenna can be formed into a receiving beam. The specific working principle of is as follows.

When transmitting, the microwave signal to be transmitted is modulated onto an optical carrier with N wavelengths, and is input into the transmitting beam forming chip of the silicon-based photonic integrated chip in the integrated microwave photonic transceiver front end through a single-mode optical fiber. The light with N wavelengths is demultiplexed into N photon channels by the first wavelength demultiplexer, and all optical switches in each of the photon channels are controlled by a control integrated circuit. The photon channel includes M time delay waveguides and M+1 first optical switches, specifically, one 1×2 optical switch, M−1 2×2 optical switches and one 2×1 optical switch. Because each optical switch can control the light to pass through the following straight-through optical waveguide or optical waveguide with a certain time delay. In this way, after the M+1 optical switches and the time delay optical waveguide are cascaded, the time delay amount of each channel can be precisely regulated by the control integrated circuit. The preferred time delay optical waveguides are $2^M \Delta T, \ldots, 2^1 \Delta T, 2^0 \Delta T$ in turn. After the delayed optical signal is controlled in amplitude by a variable optical attenuator, it is converted into a microwave signal by the Ge—Si detector and input to the power amplifying chip set. The microwave signals of N channels are amplified, and then output to the phased array antenna for transmission through the microwave switch chipset.

When receiving, the microwave signal received by the phased array antenna is input into the low-noise amplifying chipset through the microwave switch chipset, and the amplified N channels of microwave signals are input into the RF input of the lithium niobate thin film modulator in the photonic integrated chip to modulate the light waves passing therethrough. Continuous wave laser with N wavelengths multiplexed into a single optical fiber at the far end is input into the second wavelength demultiplexer of the silicon-based photonic integrated chip, and the demultiplexed light with n wavelengths enters into N lithium niobate thin film modulators respectively. The modulated N channels of light waves enter N photon channels respectively, and each photon channel is similar to that in the transmitting beam forming chip, including M time delay waveguides and M+1 second optical switches, specifically, M−1 2×2 optical switches, one 1×2 optical switch and one 2×1 optical switch. The time delay amount of each channel can be precisely regulated by controlling each optical switch through the control integrated circuit, and the preferred time delay optical waveguides are $2^0\Delta T$, $2^1\Delta T$, ..., $2^M\Delta T$ in turn. After the delayed optical signal is controlled in amplitude by a variable optical attenuator, it is multiplexed into one output optical fiber by the wavelength division multiplexer for output.

In addition, the specific implementation of the silicon-based photonic integrated chip is as follows. Optical input and output ports of the silicon-based photonic integrated chip realize optical coupling between optical fibers through a coupling grating manufactured on the chip, the wavelength division multiplexer and the wavelength division demultiplexer are realized in the form of array waveguide grating. The variable optical attenuator is realized by the optical absorption effect of carrier injection, each optical switch is realized based on the thermo-optical effect of silicon material and Mach Zehnder interferometer structure. The Ge—Si detector is realized by doping germanium and waveguide coupling structure in silicon material. The lithium niobate thin film modulator is a Mach Zehnder type intensity modulator based on lithium niobate thin film technology, which is fixed on the silicon chip by bonding. The lithium niobate thin film waveguide and the silicon waveguide are optically interconnected by evanescent wave coupling. Other photonic units directly manufactured on the silicon chip directly realize optical interconnection through silicon waveguides, and various time delays of $2^0\Delta T$, $2^1\Delta T$, ..., $2^M\Delta T$ are realized through silicon waveguides with different lengths.

The above-mentioned embodiments illustrate the purposes, technical schemes and advantages of the present disclosure in further detail. It should be understood that the above-mentioned embodiments are only the preferred embodiments of the present disclosure, and are not intended to limit the present disclosure. Any modifications, equivalent substitutions, improvements, etc. made within the spirit and principle of the present disclosure should be included in the scope of protection of the present disclosure.

The invention claimed is:

1. An integrated microwave photon transceiving front-end for a phased array system, comprising: a ceramic substrate, on which a control integrated circuit is carried, a silicon-based photonic integrated chip, a first amplifying chipset, a second amplifying chipset, and a microwave switch chipset are carried, wherein the control integrated circuit is configured to control the silicon-based photonic integrated chip and the microwave switch chipset by means of an input control signal;

wherein the silicon-based photonic integrated chip is connected at one end with an input/output optical fiber, and at the other end with the first amplifying chipset and the second amplifying chipset;

wherein the first amplifying chipset and the second amplifying chipset are connected to the microwave switch chipset respectively, and the microwave switch chipset is further connected with a phased array antenna;

wherein the silicon-based photonic integrated chip comprises a transmitting beam forming chip and a receiving beam forming chip, the transmitting beam forming chip comprising a first wavelength division demultiplexer, a plurality of first optical switches, and a Ge—Si detector, wherein the first wavelength division demultiplexer is configured to receive an optical signal from the input optical fiber and demultiplex the optical signal into a plurality of photon channels, and each photon channel is formed by the plurality of first optical switches connected in series and a plurality of optical waveguides with different time delays, and wherein the Ge—Si detector is configured to convert the delayed optical signal into a microwave signal, which is output to the first amplifying chipset through a traveling wave electrode.

2. The integrated microwave photon transceiving front-end for a phased array system according to claim 1, wherein the control integrated circuit is configured to convert an externally input control signal into a control level, to control on-off of each microwave switch in the microwave switch chipset, and to control a switching state of each optical switch in the silicon-based photonic integrated chip.

3. The integrated microwave photon transceiving front-end for a phased array system according to claim 1, wherein a first variable optical attenuator is further connected between the first optical switches and the Ge—Si detector.

4. The integrated microwave photon transceiving front-end for a phased array system according to claim 1, wherein the receiving beam forming chip comprises a second wavelength division demultiplexer, a plurality of second optical switches, a lithium niobate thin film modulator, and a wavelength division multiplexer; the second wavelength division demultiplexer is configured to demultiplex an optical signal input via the input optical fiber into a plurality of photon channels; the lithium niobate thin film modulator is configured to receive a microwave signal amplified by the second amplifying chipset and modulate the optical signal of each photon channel; wherein the modulated optical signal in each photon channel is transmitted through the second optical switches connected in series and the plurality of optical waveguides with different time delays, and the delayed optical signals are multiplexed into the output optical fiber through the wavelength division multiplexer for output.

5. The integrated microwave photon transceiving front-end for a phased array system according to claim 4, wherein a second variable optical attenuator is further connected between the second optical switches and the wavelength division multiplexer.

6. The integrated microwave photon transceiving front-end for a phased array system according to claim 1, wherein the first amplifying chipset is configured to amplify a power of a microwave signal output from the silicon-based photonic integrated chip; and the second amplifying chipset is configured to amplify a low noise of a microwave signal output from the microwave switch chipset.

7. The integrated microwave photon transceiving front-end for a phased array system according to claim 1, wherein the microwave switch chipset comprises a plurality of microwave switches for connecting a microwave signal between the first amplifying chipset and the phased array antenna, or connecting a microwave signal between the phased array antenna and the second amplifying chipset.

* * * * *